United States Patent
Yu et al.

(10) Patent No.: US 8,419,414 B2
(45) Date of Patent: Apr. 16, 2013

(54) MOLDING INSERT CORE AND INSERT MOLDING PROCESS UTILIZING THE CORE

(75) Inventors: Tai-Cherng Yu, Taipei Hsien (TW); I-Thun Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 217 days.

(21) Appl. No.: 12/728,264

(22) Filed: Mar. 21, 2010

(65) Prior Publication Data

US 2011/0156308 A1 Jun. 30, 2011

(30) Foreign Application Priority Data

Dec. 25, 2009 (TW) ................................ 98144911 A

(51) Int. Cl.
*B29C 33/76* (2006.01)

(52) U.S. Cl.
USPC ............................ 425/414; 425/467; 425/468

(58) Field of Classification Search .................. 425/414, 425/467, 468
See application file for complete search history.

(56) References Cited

U.S. PATENT DOCUMENTS

| 5,269,998 A * | 12/1993 | Takagi et al. ............... 264/328.1 |
| 2006/0263034 A1* | 11/2006 | Sakurai et al. ................ 385/147 |

* cited by examiner

*Primary Examiner* — Joseph S Del Sole
*Assistant Examiner* — James Sanders
(74) *Attorney, Agent, or Firm* — Altis Law Group, Inc.

(57) ABSTRACT

An exemplary molding insert core used in an insert mold includes two first molding bars, two second molding bars, two first support members, and two second support members. Each first molding bar is partially arranged on one first support member. Each second molding bar is partially arranged on one second support member.

6 Claims, 4 Drawing Sheets

```
┌─────────────────────────────────────────────────┐
│ providing a mold with a molding insert core, the │
│ molding insert core comprising at least one first support │
│ member and at least one first molding bar at least │
│ partially contacting the at least one first support member │
└─────────────────────────────────────────────────┘
                         │
┌─────────────────────────────────────────────────┐
│ introducing molten material into the mold to form an │
│ insert molded product with at least one first receiving │
│ hole and at least one first molded hole │
└─────────────────────────────────────────────────┘
```

FIG. 3

MOLDING INSERT CORE AND INSERT MOLDING PROCESS UTILIZING THE CORE

BACKGROUND

1. Technical Field

The present disclosure generally relates to molding processes, and particularly, to a molding insert core and an insert molding process utilizing the core.

2. Description of Related Art

In a typical insert molding process, a plastic material is heated to a molten state and introduced into a mold by a special feeding device. The final molded product may require a central hollow or cavity, in order to accommodate device components subsequently installed on or in the molded product. In such case, a columnar insert is deployed in the mold, whereby the central hollow is formed during molding. However, when molten material is injected into the mold at high speed and with high pressure, the molten material can deform or misalign the columnar insert, such that the central hollow is misformed. If the product is large or does not require high precision, the error in formation of the central hollow may be ignored. However, even in such cases, the quality of the product is degraded.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout various views, and all the views are schematic.

FIG. 3 is a flowchart of an exemplary insert molding process.

DETAILED DESCRIPTION

Figure 1:
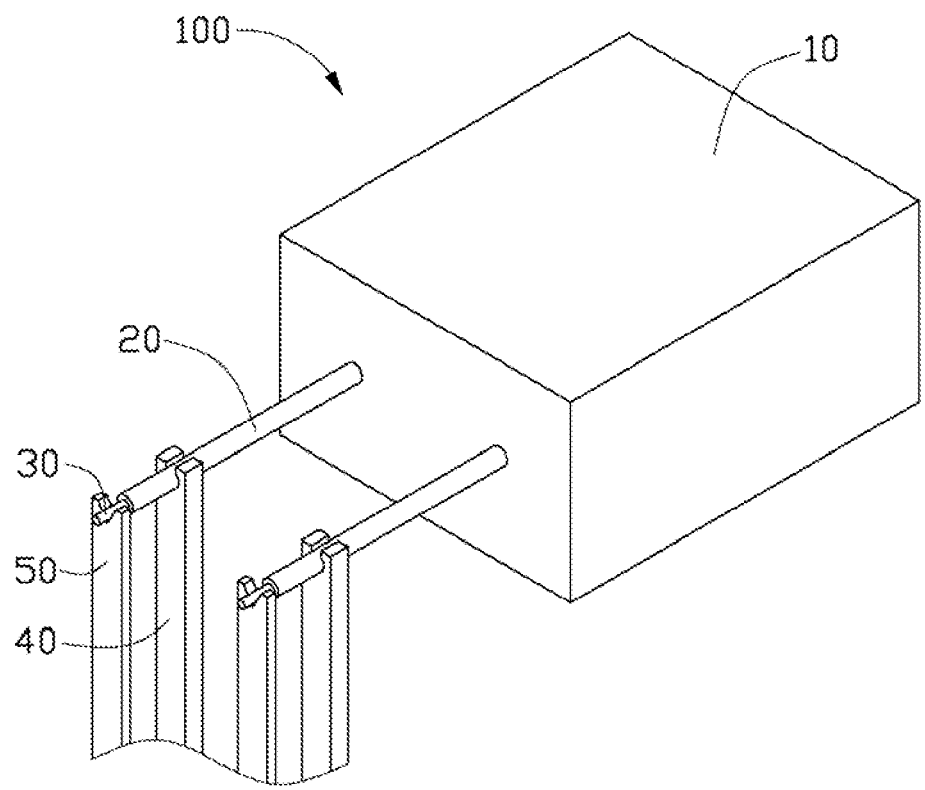
FIG. 1 is an assembled, isometric view of part of an exemplary molding insert core including two first molding bars, two second molding bars, two first support members, and two second support members.
Figure 4:
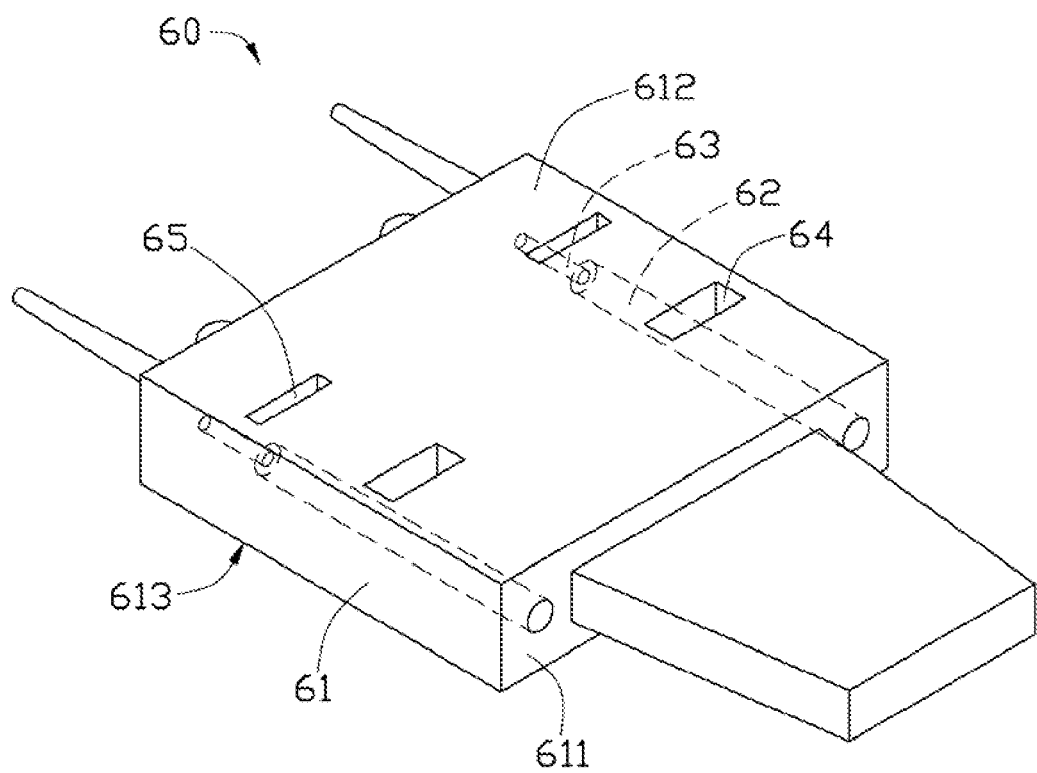
FIG. 4 is an isometric view of an insert molded product made using the molding insert core of FIG. 1, the insert molded product including two first receiving holes, two second receiving holes, two first molded holes, and two second molded holes.

Referring to FIG. 1, an exemplary molding insert core 100 is adapted to be introduced into a mold (not shown) to form an insert molded product 60 (see FIG. 4). The molding insert core 100 includes a fixing portion 10, two first molding bars 20, two second molding bars 30 extending from end surfaces of the first molding bars 20 farthest away from the fixing portion 10, two first support members 40, and two second support members 50. Each first support member 40 and each second support member 50 supports one first molding bar 20 and one second molding bar 30, respectively.

The fixing portion 10 is substantially parallelepiped and mounted in the mold (not shown).

The first molding bars 20 extend from one same end surface of the fixing portion 10. The shape and number of the first molding bars 20 are dictated by the structure of the final molded product, in this case the insert molded product 60. In the illustrated embodiment, the first molding bars 20 are columns, and are substantially parallel to each other.

Each second molding bar 30 extends from an end surface of a corresponding first molding bar 20 that is farthest away from the fixing portion 10. The shape and number of the second molding bars 30 are dictated by the structure of the final molded product, in this case the insert molded product 60. In the illustrated embodiment, the second molding bars 30 are columns, and are substantially parallel to each other. A diameter of each of the second molding bars 30 is less than that of each of the first molding bars 20.

Figure 2:
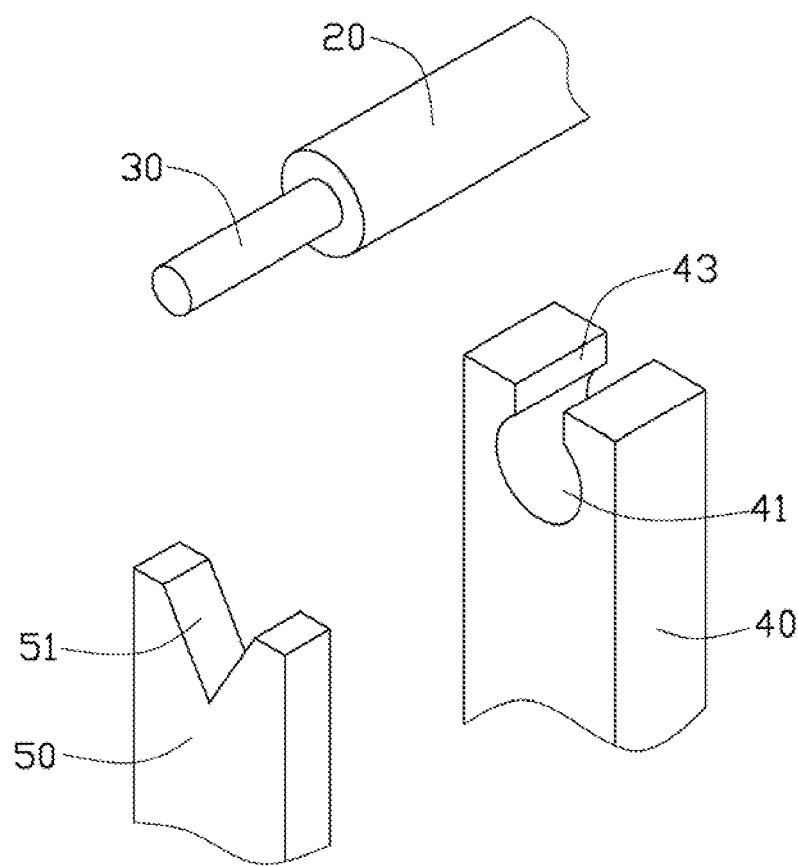
FIG. 2 is an exploded, isometric view of part of the molding insert core of FIG. 1.

Referring also to FIG. 2, each first support member 40 defines a receiving slot 41 and a through slot 43 communicating with the receiving slot 41. A diameter of the receiving slot 41 is substantially the same as that of the corresponding first molding bar 20. Each first support member 40 supports the first molding bar 20. The through slot 43 facilitates separation of the insert molded product 60 from the first support member 40.

Each second support member 50 defines a support slot 51 at a top end thereof. In the illustrated embodiment, the support slot 51 is V-shaped. The reason is, the diameter of the second molding bar 30 is typically very small, if the support slot 51 is circular or semicircular, the second molding bar 30 is easily broken during assembly to or separation from the second support member 50. The V-shaped support slot 51 alleviates this problem. Each second support member 50 supports a corresponding second molding bar 30.

Referring to FIGS. 1 and 3, during insert molding, the molding insert core 100 is positioned in a mold, and the fixing portion 10, the first support members 40, and the second support members 50 are fixed in the mold. Each first molding bar 20 extends in the receiving slot 41 of the corresponding first support member 40. Each second molding bar 30 partially contacts a wall of the support slot 51 of the second support member 50. The mold also includes cores (not shown) cooperating with the first support members 40 and the second support members 50 to position the first molding bars 20 and the second molding bars 30.

Referring also to FIG. 4, molten material is introduced into the mold having the molding insert core 100 positioned therein. A cavity (not shown) of the mold forms a main body 61 of the insert molded product 60. The first molding bars 20 and the second molding bars 30 form two first receiving holes 62 and two second receiving holes 63, respectively. The first support members 40 cooperate with the cores to form two first molded holes 64, and the second support members 50 cooperate with the cores to form two second molded holes 65, respectively.

The main body 61 includes an end surface 611, a first outer surface 612, and a second outer surface 613. The first outer surface 612 and the second outer surface 613 are arranged at opposite sides of the end surface 611. The first receiving holes 62 are defined from the end surface 611 into the inside of the main body 61, and the second receiving holes 63 are defined inside of the main body 61. Each second receiving hole 63 communicates with and is coaxial to a corresponding first receiving hole 62. A diameter of the second receiving hole 63 is less than that of the first receiving hole 62. Each first molded hole 64 is defined from the first outer surface 612 through the second outer surface 613, and transversely intersects an entire cross-sectional area of a corresponding first receiving hole 62. Each second molded hole 65 is defined from the first outer surface 612 through the second outer surface 613, and transversely intersects an entire cross-sectional area of a corresponding second receiving hole 63.

The molding insert core 100 uses the first support members 40 and the second support members 50 to support the first molding bars 20 and the second molding bars 30, thereby helping to prevent the first molding bars 20 and the second molding bars 30 from elastically deforming or slanting. Accordingly, the accuracy and dependability of the insert molded product 60 is improved, even when the insert molded product 60 has a small structure.

In addition, the first support members 40 and the second support members 50 of the molding insert core 100 form the first molded holes 64 and the second molded holes 65 of the insert molded product 60. The positions of the first support members 40 and the second support members 50 can be adjusted to ensure that the corresponding first molded holes 64 and second molded holes 65 do not affect the function or utility of the insert molded product 60.

Finally, while various embodiments have been described and illustrated, the disclosure is not to be construed as being limited thereto. A variety of modifications can be made to the embodiments by those skilled in the art without departing from the true spirit and scope of the invention as defined by the appended claims.

What is claimed is:

1. A molding insert core for putting into a cavity of a mold to form an insert molded product, comprising:
    at least one first molding bar;
    at least one second molding bar extending from one end surface of the at least one first molding bar;
    at least one first support member supporting the at least one first molding bar, wherein the at least one first molding bar at least partially contacts the at least one first support member; and
    at least one second support member supporting the at least one second molding bar, wherein the at least one second molding bar at least partially contacts the at least one second support member, the at least one first support member defines a receiving slot, the at least one first molding bar extends through the receiving slot; the at least one first molding bar is columnar with a diameter substantially the same as the diameter of the receiving slot of the at least one first support member, the at least one first support member further defines a through slot communicating with and perpendicular to the receiving slot, the at least one first support member is configured to form at least one first molded hole of an insert molded product formed in the cavity of the mold, and the at least one second support member is configured to form at least one second molded hole of the insert molded product.

2. The molding insert core of claim 1, wherein the at least one second support member defines a support slot in which the at least one second molding bar is partially received.

3. The molding insert core of claim 2, wherein the support slot of the at least one second support member is V-shaped.

4. The molding insert core of claim 1, wherein the at least one second molding bar is columnar.

5. The molding insert core of claim 4, wherein the at least one first molding bar is substantially coaxial to the at least one second molding bar.

6. The molding insert core of claim 1, wherein the at least one first molding bar is two first molding bars, the at least one second molding bar is two second molding bars, the at least one first support member is two first support members, and the at least one second support member is two second support members.

* * * * *